US011627210B2

(12) United States Patent
Huang et al.

(10) Patent No.: US 11,627,210 B2
(45) Date of Patent: Apr. 11, 2023

(54) MOBILE TERMINAL

(71) Applicant: VIVO MOBILE COMMUNICATION CO., LTD., Guangdong (CN)

(72) Inventors: Kai Huang, Guangdong (CN); Zongwen He, Guangdong (CN); Huasheng Zhu, Guangdong (CN); Kecheng Zhang, Guangdong (CN); Hongchao Zhao, Guangdong (CN); Guangji He, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 200 days.

(21) Appl. No.: 17/106,593

(22) Filed: Nov. 30, 2020

(65) Prior Publication Data

US 2021/0092210 A1 Mar. 25, 2021

Related U.S. Application Data

(63) Continuation of application No. PCT/CN2019/086131, filed on May 9, 2019.

(30) Foreign Application Priority Data

May 29, 2018 (CN) .......................... 201810533880.7

(51) Int. Cl.
*H04M 1/02* (2006.01)
*G01S 17/89* (2020.01)
*H04N 23/57* (2023.01)

(52) U.S. Cl.
CPC .......... *H04M 1/0264* (2013.01); *G01S 17/89* (2013.01); *H04M 1/0266* (2013.01); *H04N 23/57* (2023.01)

(58) Field of Classification Search
CPC . H04M 1/0264; H04M 1/0266; H04N 5/2257
(Continued)

(56) References Cited

U.S. PATENT DOCUMENTS 11,233,923 B2 * 1/2022 Nicholson ............ H04N 5/2251
2009/0009628 A1 * 1/2009 Janicek ................. H04N 7/144
348/333.01
(Continued)

FOREIGN PATENT DOCUMENTS

CN 103324362 A 9/2013
CN 206178141 U 5/2017
(Continued)

OTHER PUBLICATIONS

European Search Report received from European Patent Office for EP19810590.0; dated Jun. 22, 2021, 10 Pages.
(Continued)

*Primary Examiner* — Thomas J Lett
(74) *Attorney, Agent, or Firm* — Brooks Kushman P.C.

(57) ABSTRACT

A mobile terminal is provided. The mobile terminal includes: a housing, a cover plate, a display panel and a photographing device, where an accommodation space is formed between the housing and the cover plate, the display panel and the photographing device are provided in the accommodation space, the photographing device is provided on a side of the display panel away from the cover plate; a first region of the display panel facing the photographing device is provided with a light shielding layer for shielding light at a predetermined wavelength, and the light at the predetermined wavelength is allowed to pass through a second region of the display panel facing the photographing device.

11 Claims, 2 Drawing Sheets

(58) Field of Classification Search
USPC .................................................. 455/556.1
See application file for complete search history.

(56) References Cited

U.S. PATENT DOCUMENTS

| | | | |
|---|---|---|---|
| 2010/0238136 | A1 | 9/2010 | Chang |
| 2012/0105400 | A1 | 5/2012 | Mathew et al. |
| 2016/0109232 | A1 | 4/2016 | Shin et al. |
| 2018/0260079 | A1 | 9/2018 | Zhang |
| 2019/0012555 | A1* | 1/2019 | Bae .................. G06V 40/1318 |
| 2019/0033976 | A1 | 1/2019 | Cao et al. |
| 2019/0086659 | A1 | 3/2019 | Ding et al. |
| 2020/0314295 | A1* | 10/2020 | Nicholson ............. G06F 3/0425 |
| 2021/0092210 | A1 | 3/2021 | Huang et al. |
| 2021/0209728 | A1* | 7/2021 | Nicholson ............ H04N 5/2624 |

FOREIGN PATENT DOCUMENTS

| | | |
|---|---|---|
| CN | 106878564 A | 6/2017 |
| CN | 107346152 A | 11/2017 |
| CN | 107422571 A | 12/2017 |
| CN | 107436685 A | 12/2017 |
| CN | 107967025 A | 4/2018 |
| CN | 107968854 A | 4/2018 |
| CN | 207352317 U | 5/2018 |
| CN | 108769313 A | 11/2018 |
| JP | 2012098726 A | 5/2012 |
| JP | 2013148768 A | 8/2013 |
| KR | 20170130203 A | 11/2017 |

OTHER PUBLICATIONS

European Search Repod received from European Patent Office for PCT/CN2019086121, dated Jun. 22, 2021, 10 Pages.
Notice of Reasons for Refusal received for Application No. 2020-566759, dated Oct. 6, 2021,4 Pages and 4 Pages of Translation.
Notification of Reason for Refusal received for Application No. 10-2020-7037200 dated—Jun. 12, 2021, 5 Pages and 5 Pages of translation.
First Office Action dated Feb. 3, 2020 issued in Chinese Application No. 201810533880.7.
International Preliminary Report on Patentability dated Dec. 10, 2020 issued in PCT/CN2019/086131.

* cited by examiner

MOBILE TERMINAL

CROSS-REFERENCE TO RELATED APPLICATION

The present application is a continuation application of International Application No. PCT/CN2019/086131 filed on May 9, 2019, which claims a priority to the Chinese patent application No. 201810533880.7 filed in China on May 29, 2018, a disclosure of which is incorporated herein by reference in its entirety.

TECHNICAL FIELD

The present disclosure relates to the field of electronic technology, in particular to a mobile terminal.

BACKGROUND

In answer to the market demand, full screen mobile terminals have gradually come onto the market. To increase an overall screen-to-body ratio of a mobile terminal, in-screen sensor technologies such as an in-screen telephone receiver and an in-screen fingerprint sensor have emerged. The in-screen installation of a front-facing photographing device operating by sensing invisible light, e.g., a time of flight (Time of Flight, TOF) photographing device or the like, remains one of problems faced by bezel-less screens.

The TOF photographing device operates by continuously transmitting a light pulse, mainly infrared light, toward a target object, then receiving light returning from the target object with a sensor, and acquiring a distance to the target object by detecting time of flight (round trip) of the light pulse. This technology is basically similar in principle to a 3-dimensional (3D) laser sensor, but the 3D laser sensor scans dot by dot, while the TOF photographing device acquires depth information of an entire image at the same time. However, it has been proved that invisible light such as the infrared light enters a thin film transistor (Thin Film Transistor, TFT) circuit in a display screen to form a light spot, which impacts the display effect and reliability of the display screen. Therefore, in the related art, to avoid interference between the front-facing photographing device such as the TOF photographing device and the display screen, the front-facing photographing device and the display screen are generally arranged in a staggered manner and stacked separately under a cover plate, and a screen-printed transparent opening is formed on the cover plate to allow light to pass through, thereby to enable the operation of the photographing device. Apparently, this impacts the overall screen-to-body ratio of the mobile terminal and goes against the bezel-less design.

SUMMARY

An embodiment of the present disclosure provides a mobile terminal. The mobile terminal includes a housing, a cover plate, a display panel and a photographing device, where an accommodation space is formed between the housing and the cover plate, the display panel and the photographing device are provided in the accommodation space, the photographing device is provided on a side of the display panel away from the cover plate;

a first region of the display panel facing the photographing device is provided with a light shielding layer for shielding light at a predetermined wavelength, and the light at the predetermined wavelength is allowed to pass through a second region of the display panel facing the photographing device.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art may obtain other drawings based on the described drawings without any creative efforts.

DETAILED DESCRIPTION

To make the technical problem to be solved, technical solutions, and advantages of the embodiments of the present disclosure more clear, detailed descriptions are provided below with reference to the accompanying drawings and specific embodiments.

Figure 1:
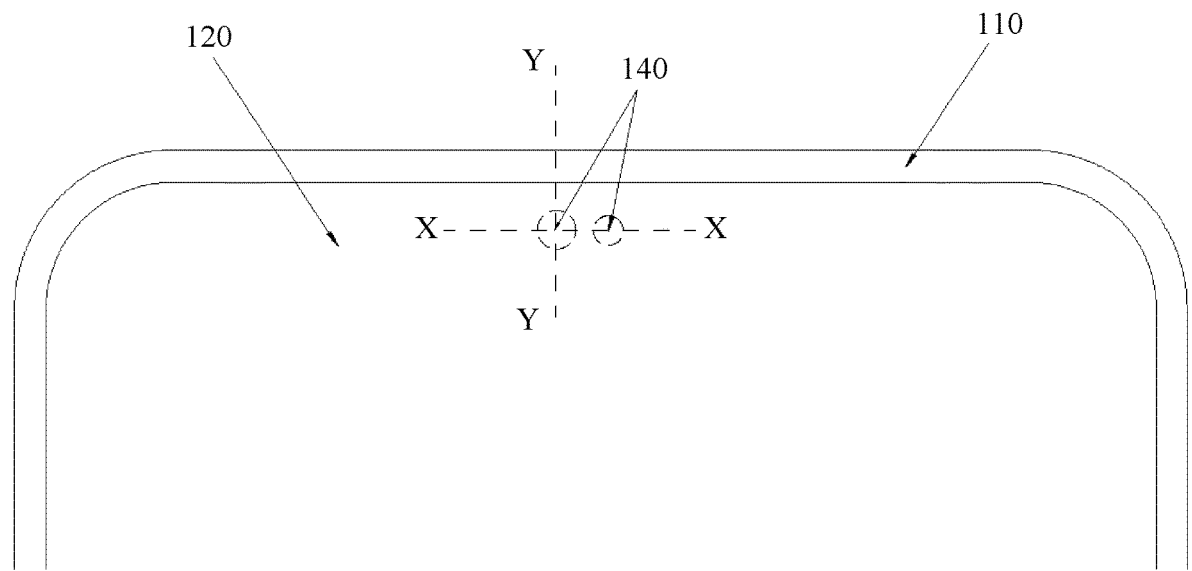
FIG. 1 is a partial structure diagram of a mobile terminal according to an embodiment of the present disclosure.
Figure 2:
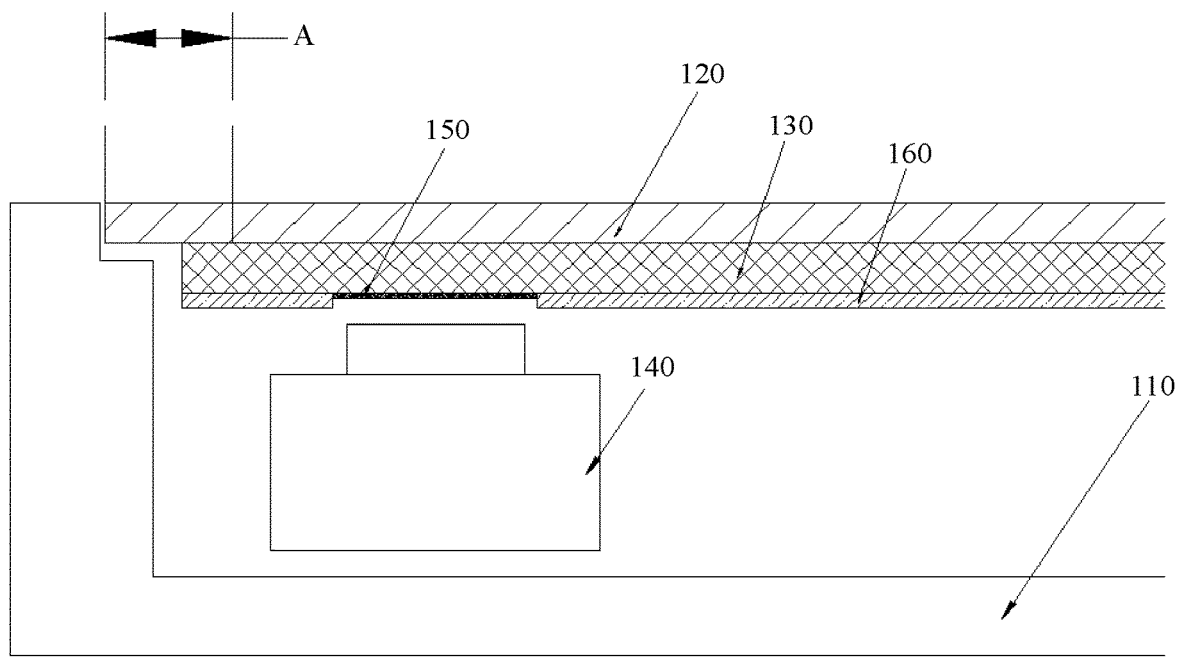
FIG. 2 is a schematic sectional diagram of the mobile terminal as shown in FIG. 1 taken along line Y-Y.
Figure 3:
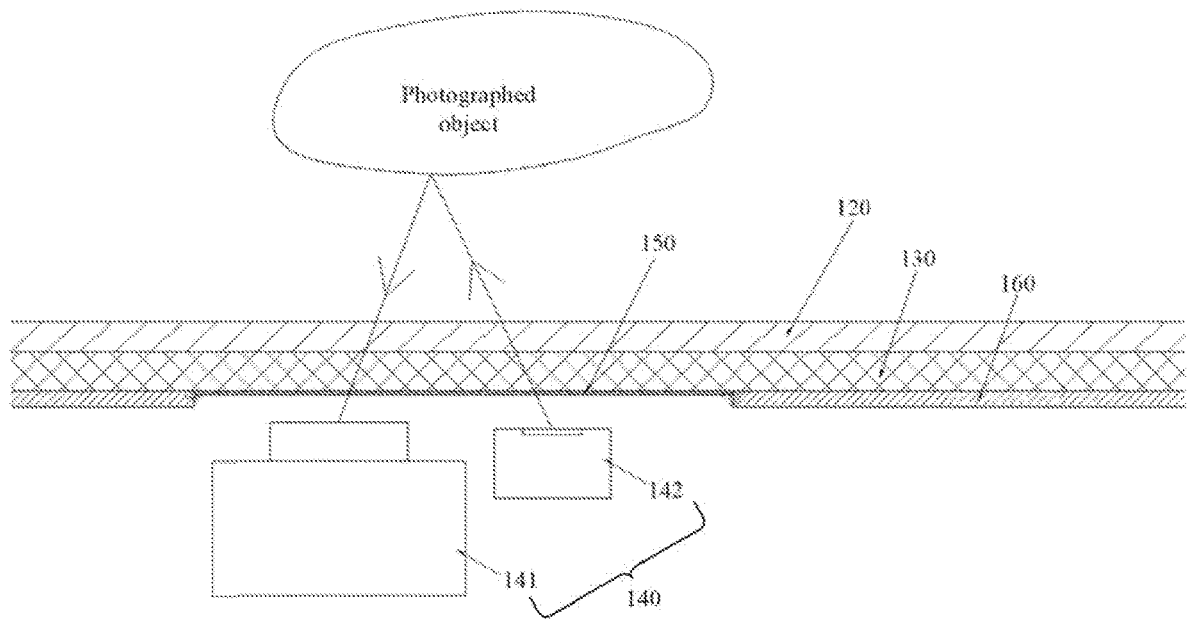
FIG. 3 is a schematic sectional diagram of the mobile terminal as shown in FIG. 1 taken along line X-X.
Figure 4:
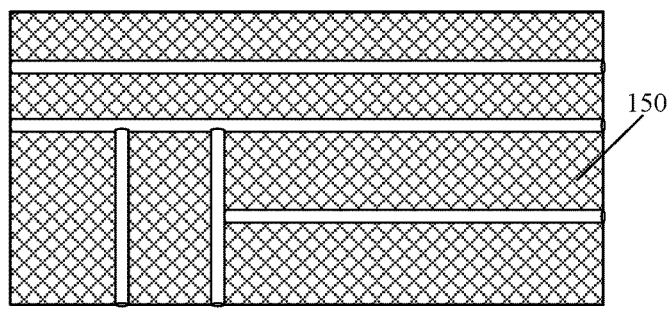
FIG. 4 is a schematic diagram of a part of a first region of a display panel according to an embodiment of the present disclosure.

FIG. 1 is a partial structure diagram of a mobile terminal according to an embodiment of the present disclosure. FIG. 2 is a schematic sectional diagram of the mobile terminal as shown in FIG. 1 taken along line Y-Y. FIG. 3 is a schematic sectional diagram of the mobile terminal as shown in FIG. 1 taken along line X-X. FIG. 4 is a schematic diagram of a part of a first region of a display panel according to an embodiment of the present disclosure.

Referring to FIG. 2 and FIG. 3, an embodiment of the present disclosure provides a mobile terminal. The mobile terminal may include: a housing 110, a cover plate 120, a display panel 130 and a photographing device 140. The photographing device 140 is used to sense light at a predetermined wavelength and perform imaging.

In an embodiment of the present disclosure, an accommodation space is formed between the housing 110 and the cover plate 120, the display panel 130 and the photographing device 140 are provided in the accommodation space, the photographing device 140 is provided on a side of the display panel 130 away from the cover plate 120. A first region of the display panel 130 facing the photographing device 140 is provided with a light shielding layer 150 for shielding light at a predetermined wavelength, and the light at the predetermined wavelength is allowed to pass through a second region of the display panel 130 facing the photographing device 140.

In an embodiment of the present disclosure, the light at the predetermined wavelength may be invisible light at a predetermined wavelength, e.g., infrared light at a predetermined wavelength ranging from 750 nm-1 mm.

In an embodiment of the present disclosure, the photographing device 140 is disposed under the display panel 130, that is, the photographing device 140 is located on the side of the display panel 130 away from the cover plate. By using the light shielding layer 150 disposed in the first region of the display panel 130 facing the photographing device 140, the light at the predetermined wavelength is prevented from affecting the display panel 130 to lead to light spot. At the same time, by providing the light at the predetermined wavelength being allowed to pass through the second region of the display panel 130 facing the photographing device 140, the photographing device 140 may sense the light at the predetermined wavelength and perform imaging.

Optionally, in an embodiment of the present disclosure, the second region may be included in the first region. As shown in FIG. 4, a first region according to an embodiment is provided with a light shielding layer 150, and further includes a second region, where a blank portion in FIG. 4 is the second region and a shaded portion in FIG. 4 is the light shielding layer 150. It should be appreciated that, the light shielding layer 150 and the second region as shown in FIG. 4 serve merely as an example of effect, such that the effects of arranging the light shielding layer 150 and the second region may be learned, and by no means serve as a limitation on a practical arrangement of the light shielding layer 150 and the second region.

In embodiments of the present disclosure, interference between the photographing device 140 and the display panel 130 may be avoided; by stacking the photographing device 140 under the display panel 130, the photographing device 140 may be prevented from additionally occupying space covered by the cover plate 120, so that the configured width of a black margin A of the mobile terminal may be reduced, as shown in FIG. 2; and a screen-printed transparent opening formed on the cover plate 120 according to the related art and used to allow light for the photographing device 140 to pass through may be removed, that is, there is no need to form on the cover plate 120 the screen-printed transparent opening used to allow the light for the photographing device 140 to pass through, as shown in FIG. 1 (a circular hole depicted with broken line in FIG. 1 represents the photographing device 140 disposed under the display panel 130, here, there is no need to form a screen-printed transparent opening in a portion of the cover plate 120 corresponding to the photographing device 140), in this way, the screen-to-body ratio and the aesthetic appeal of the mobile terminal may be improved.

In a possible embodiment of the present disclosure, thin film transistor circuits used to implement the display function of the display panel 130 are disposed in the first region, and a light shielding material for shielding the light at the predetermined wavelength is attached to surfaces of the thin film transistor circuits to form the light shielding layer 150. In this way, the light at the predetermined wavelength may be prevented from activating the thin film transistor circuits in the display panel 130 to form a light spot, thereby ensuring the display effect and reliability of the display panel 130. Meanwhile, since the light shielding layer 150 is formed by the light shielding material attached to the surfaces of the thin film transistor circuits, the light at the predetermined wavelength may be allowed to pass through gaps between the thin film transistor circuits, such that the photographing device 140 may sense the light at the predetermined wavelength and perform imaging. Here, the gaps between the thin film transistor circuits having the light shielding material attached to their surfaces form the second region used to allow the light at the predetermined wavelength to pass through. At this time, the second region is included in the first region. Further, in an embodiment of the present disclosure, the light shielding material may be plated on the surfaces of the thin film transistor circuits by using a vacuum evaporation process.

Optionally, the second region is included in the first region. Referring to FIG. 2 and FIG. 3, in a possible embodiment of the present disclosure, the first region corresponds to a photosensitive area of the photographing device 140. In this way, the light shielding layer 150 disposed in the first region is positioned in a transmission path of the light at the predetermined wavelength from the photographing device 140, thereby the light at the predetermined wavelength is prevented from affecting the display panel 130 to lead to light spot, the quantity of manufacture processes may be reduced and manufacture cost may be saved. At the same time, the second region is positioned in the transmission path of the light at the predetermined wavelength from the photographing device 140 as well, such that the photographing device 140 may sense light at the predetermined wavelength and perform imaging, thereby ensuring an unhindered function of the photographing device 140. As shown in FIG. 3, the photographing device 140 may include a camera 141 and a transmitter 142. The photographing device 140 transmits the light at the predetermined wavelength to the photographed object by using the transmitter 142, and receives the light at the predetermined wavelength returned from a photographed object by using the camera 141, thereby implementing a photographing process. Here, the light transmission path of the photographing device 140 may include a light emission path and a light receiving path of the photographing device 140, thereby ensuring that light at the predetermined wavelength is prevented from affecting the display panel 130 to lead to light spot by using the light shielding layer 150, while ensuring an unhindered function of the photographing device 140 by using the second region.

In an embodiment of the present disclosure, the mobile terminal may further include a buffer layer 160. The buffer layer 160 is attached to the side of the display panel 130 away from the cover plate 120. In an embodiment of the present disclosure, the buffer layer 160 provides support and protection for the display panel 130, and provides buffer protection for the display panel 130 in a case that the mobile terminal undergoes an external impact force.

To ensure that the photographing device 140 may properly find a view and perform imaging, i.e., to ensure that the buffer layer 160 does not impede the photographing device 140 provided on the side of the display panel 130 away from the cover plate 120 from sensing the light at the predetermined wavelength, in a possible embodiment of the present disclosure, an area of the buffer layer 160 that corresponds to the light shielding layer 150 is provided with a hole, as shown in FIG. 2 and FIG. 3.

Additionally, in a possible embodiment of the present disclosure, the buffer layer 160 may be made of foam. In this way, the buffer layer 160 may provide adequate support and protection for the display panel 130 thanks to the excellent buffer performance of the foam structure.

In a possible embodiment of the present disclosure, to ensure that the photographing device 140 is firmly disposed in the accommodation space, the side of the display panel 130 away from the cover plate 120 is provided with a support, and the photographing device 140 is disposed on the support.

In a possible embodiment of the present disclosure, the light at the predetermined wavelength is infrared light; here, the photographing device 140 is configured to sense the infrared light and perform imaging.

Further, in a possible embodiment of the present disclosure, the photographing device 140 may be a time of flight (TOF) photographing device.

Additionally, in the embodiments of the present disclosure, the mobile terminal may be a mobile phone or a tablet computer. Certainly, the mobile terminal is not limited to the mobile phone and the tablet computer, and may be an electronic device provided with photographing function and display function, such as a laptop computer or a personal digital assistant (Personal Digital Assistant, PDA).

According to the mobile terminal provided in the embodiments of the present disclosure, the interference between the photographing device and the display panel may be avoided; by stacking the photographing device under the display panel, the photographing device may be prevented from additionally occupying the space covered by the cover plate, so that the black margin of the mobile terminal may be reduced, and the screen-printed transparent opening formed on the cover plate according to the related art and used to allow the light for the photographing device to pass through may be removed, thereby improving the screen-to-body ratio and the aesthetic appeal of the mobile terminal.

It should be appreciated that, "one embodiment", "an embodiment" or "some embodiments" mentioned throughout the description means specific features, structures or characteristics related to the embodiment are included in at least one embodiment or example of the present disclosure. Therefore, "in one embodiment", "in an embodiment" or "in some embodiments" mentioned throughout the description does not necessarily refer to the same embodiment. Additionally, an element, structure or characteristic described in a drawing or an embodiment of the present disclosure may be combined in any suitable manner with an element, structure or characteristic shown in one or more other drawings or embodiments.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent in the process, the method, the article, or the device. In a case that there is no further limitation, an element preceded by "includes or including" does not preclude existence of additional identical elements in the process, the method, the article, or the device including the element.

In the present disclosure, unless explicitly specified or defined otherwise, terms such as "install", "connect", "connection", "fix" and "dispose" should be construed in a broad sense. For example, it may be a fixed connection, or a detachable connection, or integral; it may be a mechanic connection or an electrical connection; it may be a direct connection, or an indirect connection via an intermediate medium, or an interior connection of two elements or an interaction relationship between two elements. A person of ordinary skill in the art may derive the specific meaning of the term in the present disclosure according to the specific situation.

Further, in embodiments of the present disclosure, relational terms, such as "first" and "second", are merely used to distinguish one entity or operation from another entity or operation, without requiring or implying any such an actual relation or sequence existing among these entities or operations.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A mobile terminal, comprising: a housing, a cover plate, a display panel and a photographing device,
    wherein an accommodation space is formed between the housing and the cover plate, the display panel and the photographing device are provided in the accommodation space, the photographing device is provided on a side of the display panel away from the cover plate;
    a first region of the display panel facing the photographing device is provided with a light shielding layer for shielding light at a predetermined wavelength, and the light at the predetermined wavelength is allowed to pass through a second region of the display panel facing the photographing device.

2. The mobile terminal according to claim 1, wherein the first region is provided with a thin film transistor circuit, and a light shielding material for shielding the light at the predetermined wavelength is attached to a surface of the thin film transistor circuit to form the light shielding layer.

3. The mobile terminal according to claim 1, wherein the first region corresponds to a photosensitive area of the photographing device.

4. The mobile terminal according to claim 1, further comprising a buffer layer, wherein the buffer layer is attached to the side of the display panel away from the cover plate.

5. The mobile terminal according to claim 4, wherein an area of the buffer layer that corresponds to the light shielding layer is provided with a hole.

6. The mobile terminal according to claim 5, wherein the buffer layer is made of foam.

7. The mobile terminal according to claim 4, wherein the buffer layer is made of foam.

8. The mobile terminal according to claim 1, wherein the side of the display panel away from the cover plate is provided with a support, and the photographing device is disposed on the support.

9. The mobile terminal according to claim 1, wherein the light at the predetermined wavelength is infrared light.

10. The mobile terminal according to claim 1, wherein the photographing device is a time of flight (TOF) photographing device.

11. The mobile terminal according to claim 1, wherein the mobile terminal is a mobile phone or a tablet computer.

* * * * *